(12) United States Patent
Jenkins

(10) Patent No.: US 8,954,572 B2
(45) Date of Patent: Feb. 10, 2015

(54) MONITORING SYSTEM

(75) Inventor: David John Jenkins, East Grinstead (GB)

(73) Assignee: Integrated Security Manufacturing Ltd., West Sussex (GB)

( * ) Notice: Subject to any disclaimer, the term of this patent is extended or adjusted under 35 U.S.C. 154(b) by 30 days.

(21) Appl. No.: 13/383,711

(22) PCT Filed: Aug. 20, 2010

(86) PCT No.: PCT/GB2010/001577
§ 371 (c)(1),
(2), (4) Date: Feb. 2, 2012

(87) PCT Pub. No.: WO2011/023937
PCT Pub. Date: Mar. 3, 2011

(65) Prior Publication Data
US 2012/0151052 A1 Jun. 14, 2012

(30) Foreign Application Priority Data
Aug. 27, 2009 (GB) .................................. 0914973.3

(51) Int. Cl.
*G06F 15/173* (2006.01)
*G06F 11/20* (2006.01)

(52) U.S. Cl.
CPC .......... *G06F 11/203* (2013.01); *G06F 11/2035* (2013.01); *G06F 11/2005* (2013.01); *G06F 11/2048* (2013.01)
USPC ....................................................... 709/224

(58) Field of Classification Search
CPC ..................................................... G06F 11/203
USPC ................................................ 709/224–226
See application file for complete search history.

(56) References Cited

U.S. PATENT DOCUMENTS 3,750,032 A * 7/1973 Andrews .................... 455/154.2
6,067,545 A 5/2000 Wolff
(Continued)

FOREIGN PATENT DOCUMENTS

EP 1 494 421 A1 1/2005
JP 2001-335253 A 12/2001

OTHER PUBLICATIONS

GB Search Report dated Nov. 25, 2009 for Application No. GB0914973.3 (1 Page).
(Continued)

*Primary Examiner* — Brian J Gillis
*Assistant Examiner* — Michael A Keller
(74) *Attorney, Agent, or Firm* — Nutter McClennen & Fish LLP; David J. Powsner

(57) ABSTRACT

A monitoring system comprising a plurality of computers (PC1, PC2) in a network, a plurality of monitoring devices (2, 3, 5, 7, 8, 12) and a plurality of drivers (GDS) configured for the monitoring devices (2, 3, 5, 7, 8, 12), each driver (GDS) communicating with the network through a designated channel, each channel configured to be run on any of a plurality of the computers (PC1, PC2) in the network, wherein there is assigned to each channel a predefined order of priority in which an active computer (PC1, PC2) of the network is selected for running the channel and wherein the order of priority assigned to each channel varies between channels and wherein, in use, when the highest priority available computer (PC1, PC2) for any given channel is inactive, the given channel switches to the next highest priority available computer (PC1, PC2) which is active.

14 Claims, 5 Drawing Sheets

(56) References Cited

U.S. PATENT DOCUMENTS

| | | | |
|---|---|---|---|
| 6,145,089 A | 11/2000 | Le et al. | |
| 2005/0215265 A1* | 9/2005 | Sharma | 455/453 |
| 2005/0262411 A1 | 11/2005 | Vertes et al. | |
| 2006/0161552 A1* | 7/2006 | Jenkins | 707/10 |
| 2006/0168217 A1* | 7/2006 | Anand | 709/225 |
| 2010/0290472 A1* | 11/2010 | Raman et al. | 370/395.2 |

OTHER PUBLICATIONS

International Search Report and Written Opinion mailed Jan. 21, 2011 for Application No. PCT/GB2010/001577 (9 Pages).
International Preliminary Report on Patentability mailed Aug. 16, 2011 for Application No. PCT/GB2010/001577 (8 Pages).

* cited by examiner

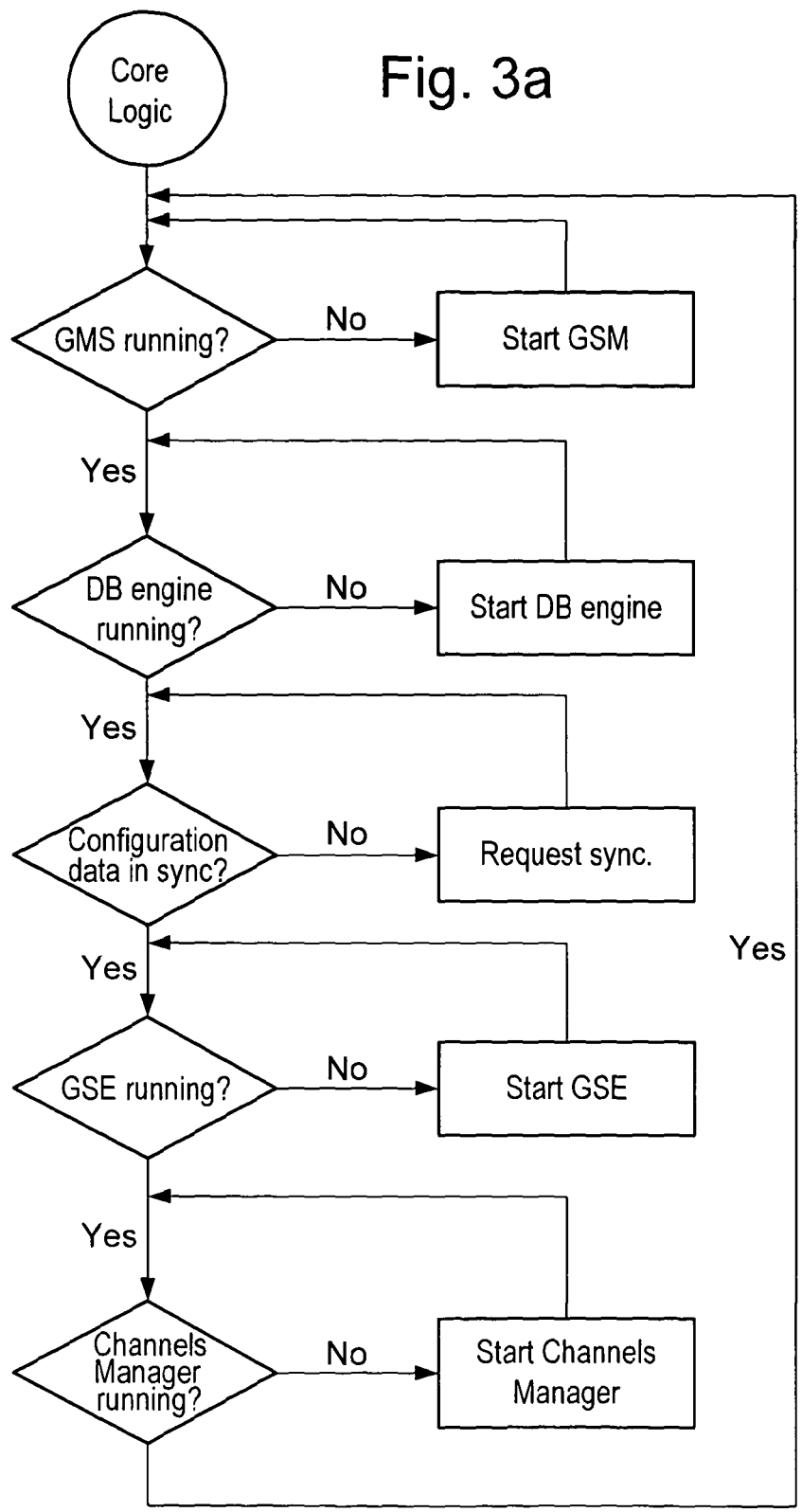

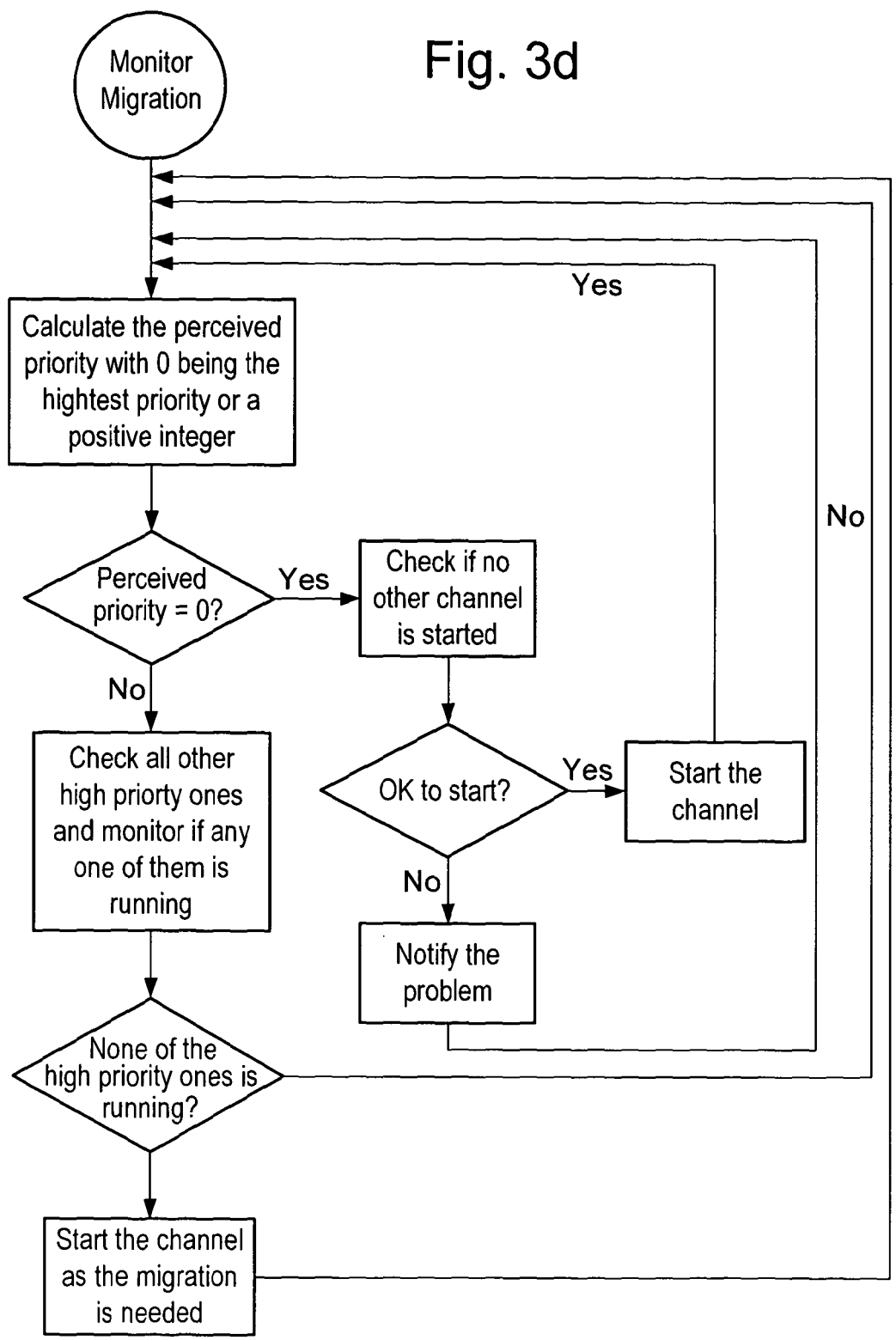

MONITORING SYSTEM

The present invention relates to a monitoring system and method. In particular, it relates to a system for security management for monitoring and controlling multiple devices in a secure environment such as an airport, a bank, a prison or a workplace.

A secure environment, such as a multisite commercial bank or a prison, comprises a plurality of buildings, with multiple rooms and corridors. Within the building there will be several security devices including local CCTV, remote CCTV, monitor wall displays, access controls with alarm systems, digital video recorders, intercoms to lifts, barriers and doors, trunk radio systems, public address systems, fire alarms, intruder alarms and other electronic surveillance and monitoring equipment. The monitoring of these security devices requires a high level of manpower. Using a large number of people to operate the system increases the risk of human error. A security system capable of controlling and monitoring multiple devices simultaneously eliminates the need to employ large numbers of staff and reduces the risk of error. An integrated system allows a user to operate several security devices through one front end interface, which allows the user to view outputs from the monitoring equipment including displays and data output.

The applicant's earlier European Patent Number 1787270 (EP1787270) describes a monitoring system with a high level of integration, comprising a network of computers and condition sensing and monitoring devices. The computers within the system are arranged to enable any one of the computers to act as a server at any time and for all the other computers to act as clients and to become the server if the first server becomes unable to act as a server. This protects the system from any failure of its components and, in particular, to failure of the server or any failure causing access to the server to be restricted or blocked.

The applicant's earlier migrating server technology discloses the concept of computers within the system being defined as a server and the remaining computers acting as client machines. If the designated server becomes inactive at any time then all client machines will switch to using the next highest active machine as a server. The migrating server system utilises a hierarchal list of computers that can become servers. However, it has been found that this system can still fail and there are limits to the "run time availability" of the monitoring system.

A monitoring system with multiple integrated devices is supported by multiple drivers. Each computer within a monitoring system has configured channels and a monitoring system using multiple computers has multiple channels. In the system of EP1787270 when a server migrates to the next highest active server machine then all channels are transferred from one computer to another computer. This can lead to an uneven spread of the workload between the computers because each channel may not impose the same workload on its respective computer and the workload will also depend on which driver is being used by a channel. If any driver in the monitoring system encounters a problem, such as a "runtime exception", it will bring down the entire monitoring system and so reduce a user's runtime availability. In the context of the present invention, a driver is understood to be a piece of software entity that provides the actual integration between the security devices and the security monitoring software.

The present invention sets out to provide an improved monitoring system, which alleviates the problems described above by providing a system with increased efficiency and high runtime availability, which is also easier to maintain and extend.

In one aspect, the invention provides a monitoring system comprising a plurality of computers in a network, a plurality of monitoring devices and a plurality of drivers configured for the monitoring devices, each driver communicating with the network through a designated channel, each channel configured to be run on any of a plurality of the computers in the network, wherein there is assigned to each channel a predefined order of priority in which an active computer of the network is selected for running the channel and wherein the order of priority assigned to each channel varies between channels and wherein, in use, when the highest priority available computer for any given channel is inactive, the given channel switches to the next highest priority available computer which is active.

By assigning the channels and so the drivers to different computers within the monitoring system, the workload of the monitoring system is spread across all channels. A predetermined hierarchical list by which the channels are assigned to a computer allows the system to compensate when any specific channel/s' driver requires extra processing needs.

By re-assigning the channels from an "out-of-service" computer to multiple other computers, rather than to a single computer, and effectively migrating the drivers when one or more computers is out of service, the likelihood that the monitoring system will break down is reduced and there is an increase in a user's runtime availability.

More preferably, if the currently assigned computer is considered to be active but a further computer which is higher in the priority list of computers available becomes available, then the channel is assigned to the further computer.

Preferably, the monitoring system further comprises a storage means to store the current state of the or each condition sensing and/or monitoring device.

More preferably, the monitoring system further comprises an output means to output the current state of the or each condition sensing and/or monitoring devices.

By storing the current state of the devices within the monitoring system, if a user's computer/workstation shuts down, then when the workstation is re-started the user will be able to establish the current state of the device/s.

Preferably, the monitoring system further comprises a trigger means, wherein the trigger means reacts to the current state of one or more condition sensing and/or monitoring devices.

Within the context of the specification the wording "comprises" is taken to mean "includes, among other things". It is not intended to be construed as "consists of only".

For the purposes of clarity and a concise description, features are described herein as part of the same or separate embodiments; however it will be appreciated that the scope of the invention, as defined by the claims, may include embodiments having combinations of all or some of the features described.

The invention will now be described by way of example with reference to the accompanying drawings, in which:

FIGS. 3a-3d are flow charts illustrating the migrating channel/driver routine of the present invention and how the routine is integrated into the control of the monitoring and surveillance system.

Figure 1:
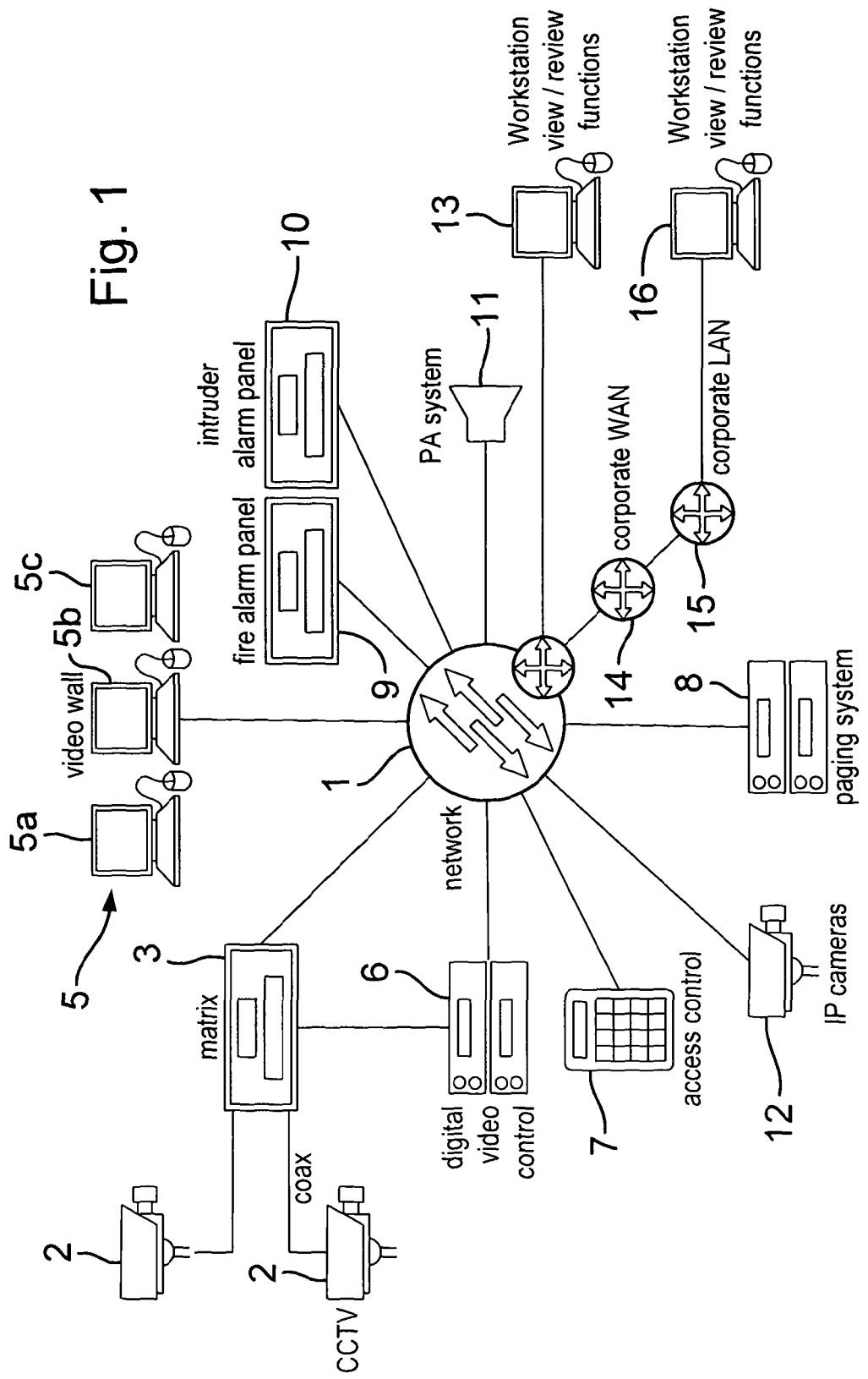
FIG. 1 is a schematic drawing of the monitoring and surveillance system of the present invention.

FIG. 1 shows a monitoring system for use in a secure environment, comprising a plurality of sensors, surveillance devices and other types of equipment connected via a network 1 to a control system. The system is shown by way of example only and many different types of configuration are used in addition to that shown in FIG. 1. The system comprises a number of closed circuit television cameras (CCTVs) 2 connected to a camera matrix 3, a digital video control apparatus 4 is connected to this and the network is such that it can control the movement, scanning and imaging of the cameras. Images from the cameras can be views in real time, or as recorded video, or on a video wall 5. The video wall comprises a plurality of display screens 5a, 5b, 5c or comprises just a single display screen. The system may also include access control means 7, such as keypads; finger print readers; retune scanners and various control means, locking mechanisms etc at locations through the secure areas, which include doors, cells, corridors etc.

The system also includes a paging system 8, which is connected to the network. The paging system may also include means for location sensing and means for detecting if a user is in a desired or undesired location. For example, in a prison environment prison officers may carry portable pagers and if the officer is in trouble the pager detects if the officer has been in one location for longer than was envisaged.

The system may also have integrated within it a fire alarm, intruder alarm systems, a fire alarm panel 9 and an intruder alarm panel 10. An intercom system, such as a public address system 11 with speakers and/or microphones to allow two-way communication is also included. FIG. 1 also shows an Internet Protocol (IP) camera 12 which is remotely located and connected over a wide areas network such as the internet. The first work station 13 allows a user to use viewing and reviewing functions for giving an overall view of the security situation.

The apparatus shown in FIG. 1 may form part of a wider corporate wide area network 14, which can be at a physically separate location. A further corporate LAN 15 may include one or more workstations which allow users to view data from the monitoring and surveillance systems.

The monitoring system comprises a plurality of components, which are connected together in a network. This includes components which are connected together by a wired bus or other types of networking, such as Ethernet networks, and may also include wireless devices connected via wireless communication systems such as WI-FI™, optical systems, Bluetooth™ or other wireless communication methods.

The sensing, surveillance and monitoring equipment of FIG. 1 are connected to a network and a plurality of computers (not shown) is also connected to the network. The computers controlling the monitoring system comprise Genesys Migrating System Technology (GMSTS). The system is arranged to enable any one of the computers to act as a server at any time and for all the other computers to act as clients and to become the server if the first server becomes unable to act as a server.

The graphical user interface components (GUI) of the monitoring system are separate from the device drivers. This allows the GUI to be designed and maintained independently of the device driver, which makes extension of the system easier.

Figure 2:
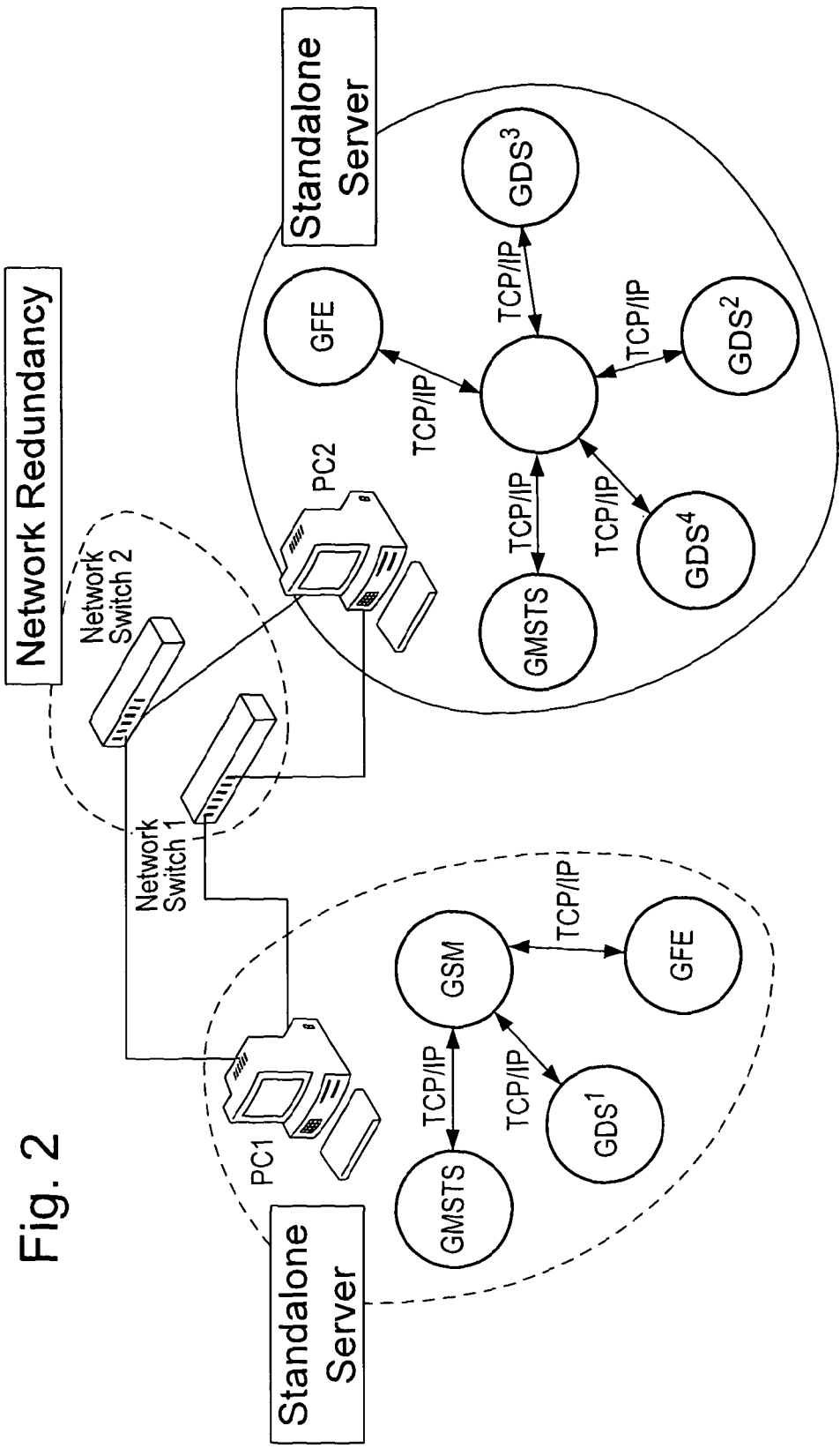
FIG. 2 is a schematic drawing of part of the system of FIG. 1.

FIG. 2 schematically shows part of the control and monitoring apparatus, which comprises two computers PC1 and PC2. The core elements of the monitoring system are shown, wherein each of the two computers PC1 and PC2 is connected to a standalone server 21. The elements of each system include the migrating system technology (GMSTS) discussed above; one or more drivers implemented as Genesys Driver Service (GDS); a front end user interface—Genesys Front End (GFE); and a messaging service—Genesys Messaging Service (GMS) to carry messages between processes. Messages are transported using TCP/IP transportation and are encrypted. As shown, each computer, PC1, PC2 is connected with two networks interfaces to two separate network switches S1, S2. If one of the network switches S1, S2 fails, communication across the monitoring system can continue via the alternative or secondary network switch.

Each computer has configured channels, which do not need to be run on any particular computer. The channels are used for inter-process communication and are spread between the computers available. For example, if the monitoring system has five computers and ten configured channels, each computer can just run two channels or any arbitrary number between 1 and 10. Each channel is assigned a list of computers that it can run on. The highest computer in that list has the highest priority and the monitoring system uses the hierarchal list of computers to determine the computer to which each channel will be assigned.

For each channel if the highest computer in the priority list is available then the channel will be assigned to this computer. If the highest computer in the priority list fails, the second highest computer in the priority list will be assigned to the channel. If the second highest computer in the priority list fails, the third, the fourth, and so on, will be assigned to the channel.

This migrating driver technology of the present invention spreads the workload between the computers. Each channel may or may not impose the same workload on the computer to which it migrates. This will depend on what driver is being used by a channel. The driver allows the computers to interact with the hardware device components of the monitoring system shown in FIG. 1. The monitoring system allows each driver to run on a different computer and migrate separately from other drivers. The monitoring system stores a list of IP addresses for all machines in the system and a list of all currently configured channels. The list of IP address is arranged in the order in which the driver is to be active, as illustrated in the routine shown in the examples below.

The "migrating driver" routine of the present invention is illustrated in the flow charts of FIGS. 3 (a)-3(d) and in the examples set out below.

Referring to FIG. 3(a), which illustrates the system of the present invention at the highest level, before starting to run the system, the core elements of the system are checked. All criteria relevant to the running of the core elements of the system are checked before the system starts. Only if all elements of the system are running successfully does the monitoring system start. As shown, the system checks that the Genesys Messaging Service (GMS) is running and, if it is not, then the GMS is started. The system then checks that the database (DB) engine is running and, if it is not, then the DB engine is started. The system then checks if the configuration data is synchronised and, if it is not, then the system requests that the data be synchronised before continuing. The configuration data defines how many channels will be used and what driver each channel should be set to, which is illustrated in "Driver Migration—Example 1" and "Driver Migration—Example 2", set out below. The system then checks the Genesys State Engine (GSE), which is used to record the current state of each device and notifies the front end of the system if the device's state changes. If the GSE is not running then the GSE is instructed to start. If the GSE is running the system progresses to check that the Channel Manager is running and, if it is not, then the system starts the Channel Manager. FIG. 3(a) shows the core logic of the system whereby the successful running of each of the elements is continually checked.

Figure 3B:
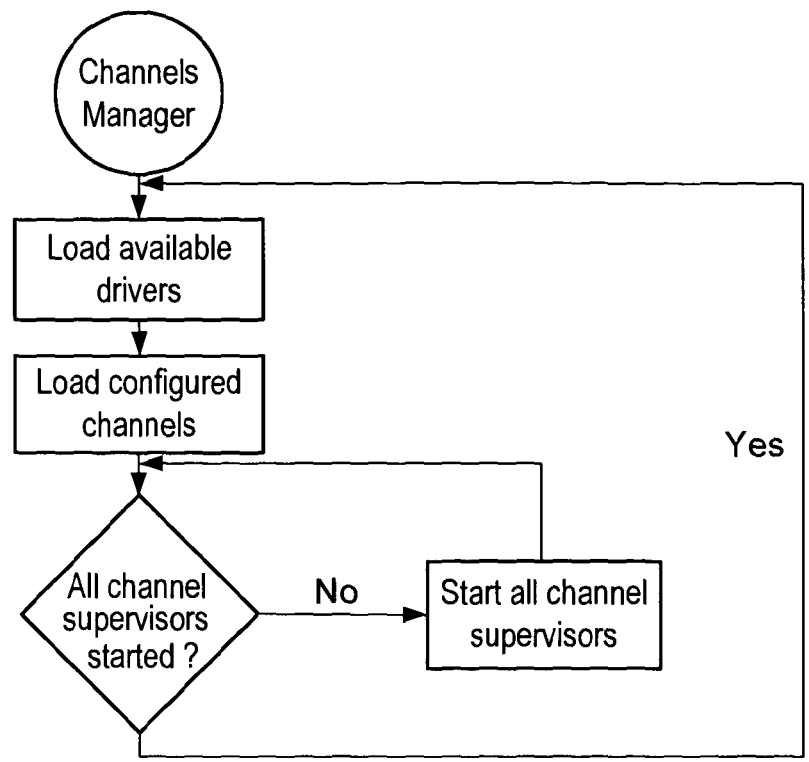

The operation of the Channel Manager is described in more detail with reference to FIG. 3(b). The Channel Manager loads all available drivers and loads all configured channels. The Channel Manager checks the channels that are configured for each of the loaded drivers. It is to be understood that in the context of the present invention, reference to the migrating driver technology can also be interpreted as migrating channel technology. This is illustrated later with reference to Examples 1 and 2. The Channel Manager checks each driver to ensure that it is available to the system. For example, it checks to see if a user has the appropriate access to the system. The Channel Manager will check that the appropriate dongle is plugged in and can also check if a time based license exists. This enables the system to verify for a specific user if a specific driver is allowed to run. Once the drivers are loaded and the channels configured the system passes over to the Channel Supervisors.

Figure 3C:
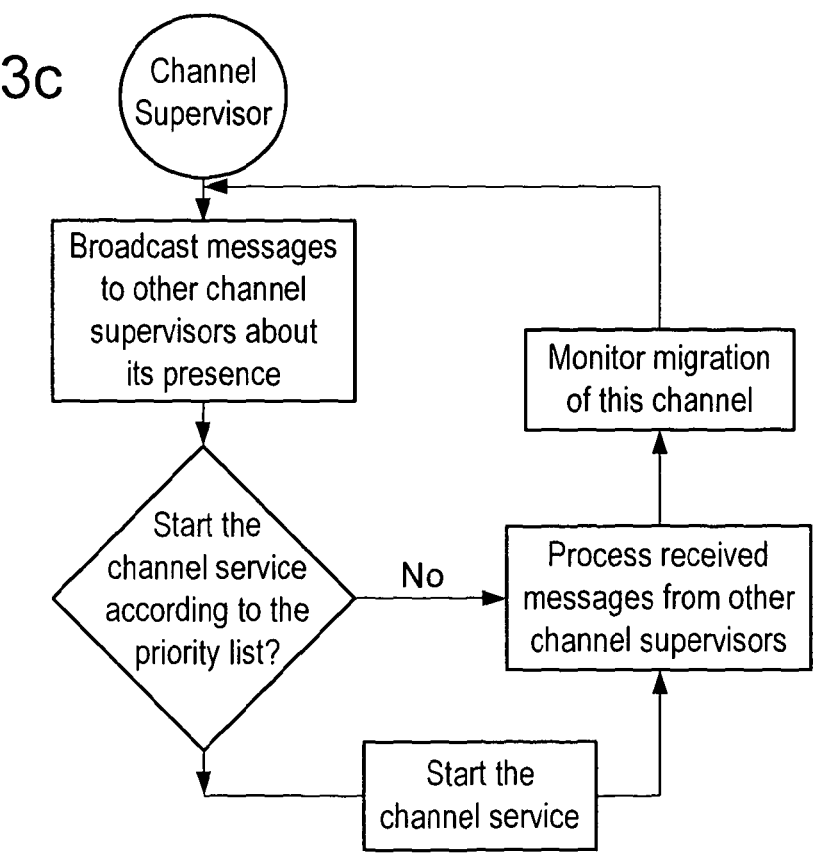

FIG. 3 (c) illustrates the process carried out by each channel supervisor. As shown, once the channel supervisor is running it broadcasts messages to all other channels supervisors, which are running, to notify them of its presence. The channel supervisor starts the service of each channel according to the pre-defined priority list determining on which computer each channel will run. If the channel supervisor fails to start, it will notify the front end of the system about the possible reasons for failure.

Referring to FIG. 3(d), the migration between computers is monitored by calculating for each channel the perceived priority of each PC that it can run on. The highest priority is referred to as 0 and the remaining priorities in the hierarchal list of computers are referred to consecutively as positive integers, n. The "perceived priority" takes into account that not all PCs in the predefined list will be available. The priority list of PCs can be referred to as $PC_0, PC_1, PC_2, PC_3, \ldots PC_n$. The perceived priority will be different to the actual priority list if one of the PCs is not running. For example if $PC_2$ is not available, then the perceived priority list of PCs will be $PC_0, PC_1, PC_3, \ldots PC_n$.

The migration monitor checks whether the highest priority PC is available, that is, is the "perceived priority=0?". If this is positive and the highest priority PC is available then the monitor checks that no other channel is already running. If there is no other channel running then the system migrates the channel to the highest priority PC and the monitor instructs that channel to start. If there is a problem preventing the migration monitor from instructing the channel to start, for example if another channel has already started, then the problem is notified to the monitor for further checking.

If the highest priority PC is not available, that is, the "perceived priority" is greater than 0 then the migration monitor checks through the hierarchal list of PCs to determine the perceived priority, that is, which PCs are running. If none of the PCs in the list are running then this is reported to the migrating monitor. If a PC further down the perceived priority list, with a higher perceived priority than 0, is running then the next preferred PC (i.e. with the lowest n value) in the list is assigned to the channel and the monitor instructs the channel to start. In order to make each PC aware of other PCs in the network, each PC broadcasts "heartbeat messages" to the network periodically. Hence the migrating server technology on each PC is made aware of its neighbouring PCs by simply maintaining a list of "last seen" PCs.

Migrating Driver

Example 1

For the purposes of illustration, the example includes five computers named PC1, PC2, PC3, PC4 and PC5. There are five channels being configured and the priority list is as set out below:

TABLE 1

|  | Channel 1 | Channel 2 | Channel 3 | Channel 4 | Channel 5 |
|---|---|---|---|---|---|
| Highest Priority | PC1 | PC2 | PC3 | PC4 | PC5 |
|  | PC2 | PC3 | PC4 | PC5 | PC1 |
|  | PC3 | PC4 | PC5 | PC1 | PC2 |
|  | PC4 | PC5 | PC1 | PC2 | PC3 |
| Lowest Priority | PC5 | PC1 | PC2 | PC3 | PC4 |

As shown in Table 1, when all the computers are running, channel 1 will be running at PC1, channel 2 will be running at PC2, channel 3 will be running at PC3, channel 4 will be running at PC4, and channel 5 will be running at PC5. However, if any PC is out of service each channel will migrate according to the pre-defined priority list. This is illustrated in Table 2 below:

TABLE 2

| Out of service PCs | Channel 1 | Channel 2 | Channel 3 | Channel 4 | Channel 5 |
|---|---|---|---|---|---|
| PC1 | PC2 | PC2 | PC3 | PC4 | PC5 |
| PC1, PC2 | PC3 | PC3 | PC3 | PC4 | PC5 |
| PC1, PC2, PC3 | PC4 | PC4 | PC4 | PC4 | PC5 |
| PC1, PC2, PC3, PC4 | PC5 | PC5 | PC5 | PC5 | PC5 |
| PC5 | PC1 | PC2 | PC3 | PC4 | PC1 |
| PC1, PC3 | PC2 | PC2 | PC4 | PC4 | PC5 |
| PC1, PC3, PC5 | PC2 | PC2 | PC5 | PC4 | PC2 |
| PC2, PC4 | PC1 | PC3 | PC3 | PC5 | PC5 |

The driver migrating routine shown in Table 2 enables the workload of the monitoring system to be spread across all channels to the rest of the remaining running PCs, when any one computer is out of service.

Migrating Driver

Example 2

The present invention can also be applied when a specific channel's driver requires extra processing needs. In this situation this channel can be allocated to run on one computer only.

In the example shown in Table 3 (below) only Channel 1 is configured to run on PC1, PC2, PC3, PC4, PC5, and PC6. Channels 2, 3, 4, and 5 are configured to run on the remaining computers PC7, PC8, PC9, and PC10.

TABLE 3

|  | Channel 1 | Channel 2 | Channel 3 | Channel 4 | Channel 5 |
|---|---|---|---|---|---|
| Highest Priority | PC1 | PC7 | PC8 | PC9 | PC10 |
|  | PC2 | PC8 | PC9 | PC10 | PC7 |
|  | PC3 | PC9 | PC10 | PC7 | PC8 |
|  | PC4 | PC10 | PC7 | PC8 | PC9 |
|  | PC5 |  |  |  |  |
|  | PC6 |  |  |  |  |

TABLE 3-continued

|  | Channel 1 | Channel 2 | Channel 3 | Channel 4 | Channel 5 |
|---|---|---|---|---|---|
|  | PC7 |  |  |  |  |
|  | PC8 |  |  |  |  |
|  | PC9 |  |  |  |  |
| Lowest Priority | PC10 |  |  |  |  |

Table 4 illustrates the migrating driver routine if any one or more of the computers are out of service. Channel 1 is maintained to be running exclusively on PC1, PC2, PC3, PC4, PC5, or PC6 before all of these computers are out of service. The overall performance of the monitoring system will gradually degrade if multiple computers are out of service. The monitoring system will gradually migrate all channels to run on a single PC (PC10) when the remainder of the PCs are out of service.

TABLE 4

| Out of service PCs | Channel 1 | Channel 2 | Channel 3 | Channel 4 | Channel 5 |
|---|---|---|---|---|---|
| PC1 | PC2 | PC7 | PC8 | PC9 | PC10 |
| PC1, PC2 | PC3 | PC7 | PC8 | PC9 | PC10 |
| PC1, PC2, PC3 | PC4 | PC7 | PC8 | PC9 | PC10 |
| PC1, PC2, PC2, PC4 | PC5 | PC7 | PC8 | PC9 | PC10 |
| PC1, PC2, PC2, PC4, PC5 | PC6 | PC7 | PC8 | PC9 | PC10 |
| PC1, PC2, PC3, PC4, PC5, PC6 | PC7 | PC7 | PC8 | PC9 | PC10 |
| PC1, PC2, PC3, PC4, PC5, PC6, PC7 | PC8 | PC8 | PC8 | PC9 | PC10 |
| PC1, PC2, PC3, PC4, PC5, PC6, PC7, PC8 | PC9 | PC9 | PC9 | PC9 | PC10 |
| PC1, PC2, PC3, PC4, PC5, PC6, PC7, PC8, PC9 | PC10 | PC10 | PC10 | PC10 | PC10 |

Driver Communication

The drivers of the above-described monitoring system only send out device state change messages to the front end of the system. Each workstation further comprises a state engine, which will remember the current state of the device and inform the local front end of any new state value. If the front end shuts down on any workstation then, when that workstation starts up again, it will request all the current device states from its local state engine. The state engine will have remained active and up-to-date with the latest device state values.

Examples of state change messages are:

Input x has changed to an active state

Door y has become unlocked and open

Camera z's on-screen caption has changed from "camera 1" to "front gate".

The front end uses the current device state message to display the correct icon and show relevant information on the device's control panel.

There are two different types of device states in the monitoring system of the present invention, which are grouped or non-grouped. The type of device state enables the monitoring system to decide on the appropriate display to show to a user.

States within a group are mutually exclusive so that only one state can be set to "true" at any one time. That is, setting one of the group's states to true will automatically set all the other states in the group to false. Each grouped state will be given a group number, from zero upwards. Group zero is allocated to the main state group and group 1 and above are allocated to the sub-state groups.

Each state in a group is associated with an icon and that icon will be displayed on a map if the state's value is set to true. The icon for group zero will be displayed on map at its full size. The icons for all other groups will be displayed on top of the group zero icon and reduced in size. This allows the monitoring system of the present invention to graphically display different combinations of active states, for example, an access control device such as a door can have an active state combination "open and unlocked"; "closed and locked", "closed and unlocked" etc.

A non-grouped or single state is used to provide other device information and does not have an effect on the displayed icon. A single state has any value type as its state value.

Device Settings

A user is able to select settings for a device, which includes selecting each individual channel. When a channel has been selected, the appropriate migrating driver is queried and a user is given a list of all the different types of device the channel's driver supports. By selecting one of these device types, a user is then given a grid containing all configured devices of that type on the selected channel.

The monitoring system of the present invention allows new devices to be added by either inputting a new line into the device grid or by inputting identifiers for the new device/s.

The monitoring system of the present invention allows a user to define for each device:

One or more groups to which the device belongs;

"Standard actions" to define actions which should take place when certain standard events occur, for example if a user selects the device via the workstation.

"Triggers" to define actions which should take place when a driver sends notification about a change of state for the device.

"Properties" which define custom data the driver may need to know about the device.

"Appearance" to define the graphical images used to display the device in each of its states.

Access Groups

The monitoring system will define a collection of devices, which form an access group available to a particular user or to a particular computer/workstation. There will be various options available to a user to allow each access group to be edited. For example, individual devices can be added to an access group. Devices can be grouped together into a device group/s to minimise the time and effort in amending access groups when they are removed or added to the monitoring system. Similarly, the devices can be grouped together according to the type of device.

Predetermined default groups are defined by the monitoring system in the case that devices in an access group are not shown to any user or at any workstation. For example, when the monitoring system detects that an access group is not being shown it will work down a hierarchical list of users/workstations to find the first user or workstation that is currently active and then show the devices in that access group to the preferred user/workstation. If the monitoring system does not identify a preferred user/workstation then the devices in the access group will be shown either to all users/workstations or to no users/workstations, according to a predetermined setting.

Trigger Configurations

In a further embodiment of the present invention, the monitoring system comprises a trigger means. The trigger means are used to describe what should happen when certain things happen to a device. The trigger means removes the need for the hard coding and replaces it with a fully configurable system. In this embodiment of the present invention, the driver will only send through what changes have occurred to each of the devices state. The device configuration will then decide what state changes to look out for and what actions to take when a change occurs.

In use, a user inputs the parameters of the trigger means into the monitoring system. A set of default event trigger means will automatically be created when a device is added. The driver will send the default value to the device. For example, a default setting would be that when a FIRE state is SET to generate an ALARM. More complicated trigger means can be input manually in addition to the default settings.

The trigger means can be considered to consist of several parts as set out below:

State: the particular device state that is to be checked;

Sub-state: applicable only for some types of devices. For example, for an alarmed perimeter fence, a sub-state number will be provided which identifies the area of the fence that was alarmed. A state called a sub-cell is defined and then the number of each sub-cell is defined in the "sub-state" value;

Rule: this will define the comparison rule for checking the actual value of the state against a given value. For example, if a door device has an OPEN state then the rule could be EQUALS and the comparison value could be TRUE. This would activate the trigger when the door open state became true;

Value: this is the value which will be compared with the device state actual value to determine if this trigger should be actioned;

Actions: against each trigger means one or more actions are defined. This will tell the monitoring system what to do when the trigger condition is met. Possible options will include "generate alarm", "re-set alarm" and "run scenario".

The driver of the monitoring system will also define which users are allowed to access a device and when. This is defined by access rules, which may include defining access groups to which users and devices belong if access is permitted.

The monitoring system will also define a set of commands that will cause actions, either in the system or in the devices. The commands will be carried out either in response to user input or by an event occurring in the system, as discussed above with respect to triggers. For example the commands will be associated with a change in a device's state, or acceptance of an alarm. The commands will be able to cause actions such as generating or resetting an alarm; showing a control menu for a device; or a delay before actioning the next action.

For each device type that a driver supports, the driver will also specify which of the device states are mutually exclusive. As discussed with respect to driver communication, each set of mutually exclusive device states will make up a "grouped state". For example, a door device would have a state group that contains the "open" and "closed" states, because both states cannot be true at the same time. In this example, the device may also have another state group contained the "bolt open" and "bolt closed" states because the door can be open with the bolt open or closed, or it may be closed with the bolt open or closed. The state groups of each device are used to provide a user workstation display, for example, using icons associated with each state.

Alarm Handling

The accepting and controlling of devices by the monitoring system are separate steps. A sequence of automatic and/or manual actions must be completed in order to re-set or clear an alarm. The sequence can be presented to a user's workstation as a "tick list" of actions.

Each action a user takes in the process of handling an alarm will be transmitted over the network and recorded in the state engine (GSE) of each workstation. In this way, once an alarm has been accepted, no other users will be able to accept the alarm. Similarly, the progress through the tick list will also be recorded on each workstation should the user wish to finish processing at a later time or transfer the handling of the alarm to another user/workstation.

The monitoring system also has alarm settings, which are set according to predetermined rules. The driver is configured to define settings for each different type of alarm that a user requires to be active for each device or type of device. The settings can include default values, which are stored by the driver in the event that no other priority settings are input. The monitoring system also offers a priority template option, which allows a user to select from a list of pre-configured priority templates to define a standard template for adjusting the priority of the alarm/s. The monitoring system allows the alarm system to be reset by a user selecting from a list of pre-configured scenarios. Alternatively, if no reset scenario is selected then the driver will offer an automatic reset option. The driver also contains a list of pre-configured escalation templates, which define how an alarm is to be escalated in the event that the situation causing the alarm is not dealt with.

The above described embodiments have been given by way of example only, and the skilled reader will naturally appreciate that many variations could be made thereto without departing from the scope of the claims.

The invention claimed is:

1. A monitoring system comprising a plurality of computers in a network, a plurality of monitoring devices and a plurality of drivers that are configured for the monitoring devices and that provide integration between those drivers and the respective monitoring devices, each driver communicating with the network through a designated channel, each channel configured to be run on any of a plurality of the computers in the network, wherein there is assigned to each channel a predefined order of priority in which an active computer of the network is selected for running the channel and wherein the order of priority assigned to each channel varies between channels and wherein, in use, when the highest priority available computer for any given channel is inactive, the given channel switches to the next highest priority available computer which is active such that each driver communicating through the given channel is able to migrate separately of all other drivers to move control of a monitoring device for which the driver is configured according to the predefined order of priority.

2. A monitoring system according to claim 1 wherein, if the currently assigned computer is considered to be active but a further computer which is higher in the priority list of computers available becomes available, then the channel is assigned to the further computer.

3. A monitoring system according to claim 2, further comprising a store that includes a current state of each of the monitoring devices.

4. A monitoring system according to claim 2, further comprising output logic that outputs a current state of each of the monitoring devices.

5. A monitoring system according to claim 4, further comprising output logic that outputs the current state of each of the monitoring devices.

6. A monitoring system according to claim 5, further comprising trigger logic that reacts to the current state of one or more of the monitoring devices.

7. A monitoring system according to claim 2, further comprising trigger logic that reacts to a current state on one or more of the comprising devices.

8. A monitoring system according to claim 1, further comprising a store that includes a current state of each of the monitoring devices.

9. A monitoring system according to claim 8, further comprising output logic that outputs the current state of each of the monitoring devices.

10. A monitoring system according to claim 8, further comprising trigger logic that reacts to the current state of one or more of the monitoring devices.

11. A monitoring system according to claim 1, further comprising an output logic that outputs a current state of each of the monitoring devices.

12. A monitoring system according to claim 11, further comprising trigger logic that reacts to the current state of one of more of the monitoring devices.

13. A monitoring system according to claim 1, further comprising trigger logic that reacts to a current state of one of more of the monitoring devices.

14. A monitoring system according to claim 1 wherein the plurality of drivers and their designated channels can be reassigned to multiple available computers according to the predefined order of priority of each channel.

\* \* \* \* \*